(12) United States Patent
Notargiacomo

(10) Patent No.: US 6,320,692 B1
(45) Date of Patent: Nov. 20, 2001

(54) BIASING SYSTEM FOR AN OPTICAL MODULATOR WITH DOUBLE OUTPUT

(75) Inventor: Massimo Notargiacomo, Candelo (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/448,767

(22) Filed: Nov. 24, 1999

Related U.S. Application Data

(60) Provisional application No. 60/111,114, filed on Dec. 4, 1998.

(30) Foreign Application Priority Data

Nov. 27, 1998 (EP) ................................................ 98 122483

(51) Int. Cl.[7] ................ G02F 1/03; G02F 1/01; G02F 2/00; G02F 1/335; G02B 26/00
(52) U.S. Cl. ..................... 359/245; 359/239; 359/279; 359/325; 385/27
(58) Field of Search ...................... 359/239, 245, 359/279, 325; 383/27

(56) References Cited

U.S. PATENT DOCUMENTS

| 4,560,246 | 12/1985 | Cotter ........................... 385/27 |
| 5,253,309 | 10/1993 | Nazarathy et al. ........... 385/4 |
| 6,204,956 | * 3/2001 | Cisternino ..................... 359/328 |

FOREIGN PATENT DOCUMENTS

| 0 407 919 | 1/1991 | (EP) . |
| 0 565 035 | 10/1993 | (EP) . |
| 0 768 765 | 4/1997 | (EP) . |
| 2 293 022 | 3/1996 | (GB) . |

* cited by examiner

Primary Examiner—Georgia Epps
Assistant Examiner—Michael A. Lucas
(74) Attorney, Agent, or Firm—Finnegan, Henderson, Farabow, Garrett & Dunner, L.L.P.

(57) ABSTRACT

An external analog modulation system is described, comprising an electro-optical modulator with a double output and a driving circuit.

Figure 1:
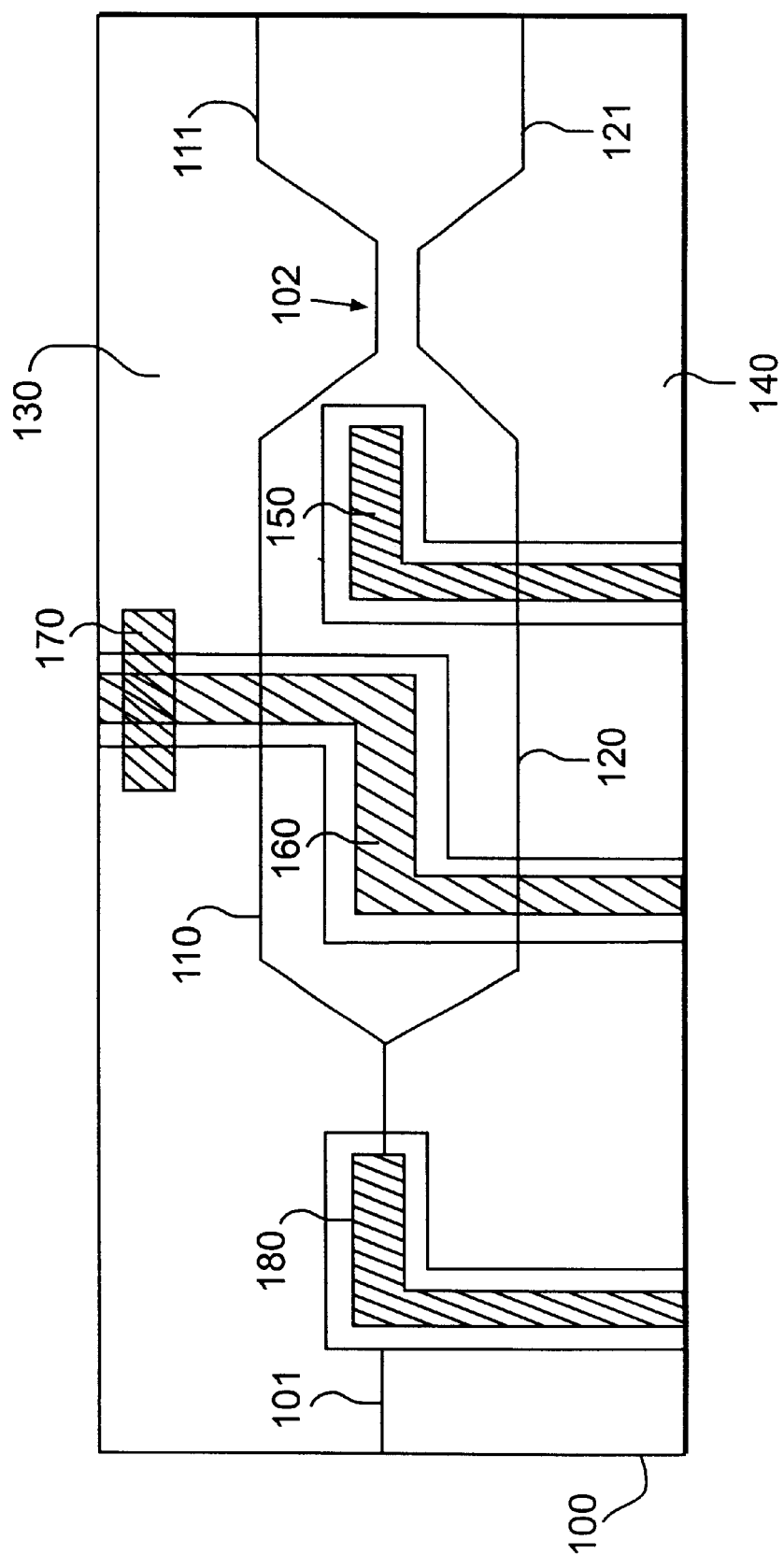

In particular, it comprises an optical source, an electro-optical modulator, an electrical modulating signal and a driving circuit for said electro-optical modulator, said electro-optical modulator having two optical outputs, supplying a first and a second modulated optical signal, which are complementary to each other, each of said two optical outputs of said modulator being connected to an optical coupler having a branch supplying a portion of modulated optical signal and connected to an optical receiver, capable of generating a first and a second electrical control signal correspondingly in response to a first frequency of said first and second analog modulated optical signals, in which said driving circuit comprises a circuit generating an electrical pilot signal at a second frequency, equal to half of said first frequency, added to said electrical modulating signal; a conversion circuit capable of producing a continuously converted signal proportional to the difference in amplitude between said first and said second electrical control signal; and a bias circuit capable of generating a bias signal in response to said control signal.

13 Claims, 3 Drawing Sheets

BIASING SYSTEM FOR AN OPTICAL MODULATOR WITH DOUBLE OUTPUT

DESCRIPTION

This application is based on European Patent Application No. 98122483.5 filed on Nov. 27, 1998 and U.S. Provisional Application No. 60/111,114 filed on Dec. 4, 1998, the content of which is incorporated hereinto by reference.

The present invention relates to a method of modulating an optical signal, and an optical emitter with external modulation.

The present invention also relates to a system for controlling the operating point of an optical modulator used in CATV systems.

The distribution of television signals in CATV (community antenna television) systems can be carried out by means of optical fibres. The optical signal can be modulated in a direct way, by acting on the optical source, normally a laser, or in an indirect way, by means of an optical modulator.

An optical modulator which can be used for the amplitude modulation of an optical signal, with a modulating signal at radio frequency (RF) having very high frequencies (such as the carriers of television channels, which conventionally range from 40 to 860 MHz), consists, for example, of a device based on an interferometer of the Mach-Zehnder type, constructed on lithium niobate ($LiNbO_3$). The 40–860 MHz band is considered to be flat within ±0.5 dB. The first channel is at 40 MHz and the last channel is at 860 MHz.

A required characteristic of an external modulator is linearity of modulation, which is very important, in particular, for use in CATV systems with transmission of the analog type, consisting of numerous television channels, for example from 40 to 80 channels.

The electro-optical characteristic, in other words the output optical power as a function of the input radio-frequency voltage, of modulators of the type mentioned is typically non-linear. To limit the signal distortion, it is desirable to make the modulator working in the vicinity of a section of the characteristic which is as linear as possible.

For this purpose, a radio-frequency modulating signal is applied to an RF electrode of an electro-optical modulator of the Mach-Zehnder interferometer type, and a continuous bias voltage, which determines the operating point of the modulator, is applied to the same electrode or to a second electrode.

An example of a modulator of this type is marketed by the applicant under the symbol PIR PIM1510.

The modulating signal, applied to the RF input, consists, for example, of the set of modulated carriers of the television channels to be distributed to the users.

In the case of a Mach-Zehnder modulator, the form of the characteristic approximates to a sinusoid, and it is advantageous for the modulator to operate in the vicinity of the inflection point of the sinusoid, with an applied voltage VQ which is that of the operating point.

The modulation characteristic of the Mach-Zehnder modulator, with respect to the operating point, can be expressed by the relation:

$$Pu = KZ \sin \beta$$

where

Pu is the output optical power,

KZ is a coefficient which depends on the characteristic of the Mach-Zehnder modulator, p1 $\beta = \pi Vm/V\pi$ is the modulation index of the modulating signals, expressed in radians, Vm is the modulation voltage, $V\pi$ is a constant.

This characteristic with a sinusoidal form is identified by two values:

the voltage $V\pi$ (shown in FIG. 3), which represents the variation of voltage to be applied to the RF input to change the optical power from the maximum to the minimum value;

the voltage VQ which represents the voltage to be applied to the bias electrode, to make the operating point correspond to the inflection point of the characteristic which has a sinusoidal form, that is it, has odd symmetry. In this case, the even-order distortions are cancelled and the odd-order distortions take on a clearly defined value.

For example, in the case of a Mach-Zehnder modulator of the PIR PIM1510 type, produced by the applicant, the aforesaid voltages may have the following values:

$$V\pi = 4.3 \text{ V}$$

and $$VQ = 0.7 \text{ V}.$$

The value of the biasing point voltage VQ is not constant, but varies with time, for example as a result of the accumulation of static charges in the $LiNbO_3$, and also with temperature.

The biasing voltage must therefore be adjusted continually, using as information, for example, the presence and amplitude of the even-order distortions, in other words the second-order intermodulation products, indicated in a general way as CSO (composite second order). The total level of the CSO must be kept suitably low to obtain good quality in the signals distributed to the users, for example more than 65 dB below the level of the vision carrier of each channel. Even when the modulator is working at the aforesaid biasing point, which minimizes the even-order distortions, the non-linearity of the input-output characteristic causes residual odd-order distortions, principally of the third order, which are manifested in intermodulation products or CTB (composite triple beats) and cross modulation (XMOD), which degrade the quality of the signals reaching the users. This is because the quality of the television channels with amplitude modulation of the carrier is strongly affected by the presence of the aforesaid intermodulation products.

To limit these distortions to some extent, it is desirable to select a depth of modulation which is not too great for the modulating signals (the term "depth of modulation" denoting the maximum value, expressed as a percentage, of the modulation index $\beta$, for example approximately 3.5% or 4% per channel, in order to operate as near as possible to the linear portion of the characteristic.

In order to limit the distortion introduced by the non-linearity of the modulator characteristic, the maximum percentage utilization of the modulator (relative to the percentage modulation) is normally approximately 40%. This is because the maximum number of channels which can be applied, allowing for the aforesaid requirements in terms of noise characteristics, is calculated by assuming that the various carriers, being non-correlated, are added statistically in quadrature; the sum of the channels is therefore considered in terms of power. Consequently, in order not to exceed the aforesaid percentage, the maximum number of channels that can be applied to the modulator is approximately 100.

To reduce the residual distortions, and in particular the third-order distortions, has been suggested of pre-distorting the modulating signals by means of non-linear elements, so that the pre-distortion is compensated by the subsequent distortion introduced by the modulator. For this purpose, it is possible to connect before the modulator a distortion circuit, having an input-output characteristic for radio-frequency signals which is the inverse function of the input-output characteristic of the modulator. This method is disclosed, for example, in the article by M. Nazarathy et al., "Progress in Externally Modulated AM CATV Transmission Systems", published in the Journal of Lightwave Technology, vol. 11, No. 1, 01/93, pp. 82–104.

Therefore, when a suitable depth of modulation has been selected for the modulating signals, the modulator must be provided with suitable circuits which enable two functions to be performed:

a) application of the bias voltage and its maintenance at the required value, to make the modulator operate at the inflection point of the sinusoidal characteristic;

b) linearization of the characteristic of the modulator, by means of pre-distortion circuits.

It is possible to apply, together with the bias voltage, a sinusoidal signal, called "pilot tone", having a predetermined amplitude and frequency (f1) (generally much lower than the minimum frequency of the radio-frequency signal band), and to detect, by means of a suitable circuit, the presence in the output optical signal of the even-order harmonics of the pilot tone (for example, the second harmonic, 2f1). The bias voltage is adjusted in such a way as to minimize the value of this second harmonic.

This method provides adequate stabilization of the bias point, corresponding to CSOs of the order of 65–70 dB.

It requires a large depth of modulation for the pilot tone (approximately 10%, according to the experiments conducted by the applicant), so that disturbances associated with the noises, especially that which is intrinsic to the photodiode, can be avoided.

A problem arising from this method for stabilizing the bias point is due to the fact that the presence of a pilot tone, together with the modulating signals, produces third-order beats which are added to the third-order beats between the modulating signals which are present in all cases because of the non-linear characteristic of the modulator. To limit the extent of these distortions, it is necessary, by contrast to what has been mentioned above, to keep the depth of modulation of the pilot tone at very low levels (approximately 1%), with the result to get signal-to-noise ratios very low for the feedback signal of the bias voltage stabilization loop and consequently a poor efficiency of the loop itself.

The frequency of the pilot tone and the corresponding depth of modulation may be selected by connecting a plurality of television channels to the modulator and observing in each of them the presence of any disturbances (generally in the form of transverse bars) occurring with particular amplitudes and frequencies of the applied tones.

The applicant has discovered experimentally that, with a pilot tone having a frequency f1 of 10.7 MHz, the maximum amplitude which can be applied to the modulator (bias electrode) is approximately 12 mV, so that the interference generated on the test pattern of a television channel is not to be visible. This amplitude corresponds to a depth of modulation of approximately 1.2%, which is inadequate for obtaining a good signal-to-noise ratio.

To reduce the amplitude of the intermodulation products between the modulating RF signals (for example, the television carriers), it is possible to use, as has been stated, the linearization technique by pre-distortion. The aforesaid technique can also be used for the pilot tone of the bias voltage control. In this case, it is necessary to send the pilot tone together with the RF signals, that is to the input of the pre-distortion circuit of the modulator. In this way both the beats between the modulating signals and the beats between the signals themselves and the pilot tone are linearized.

The applicant has observed that this entails further practical difficulties, since the circuits which amplify the signals before sending them to the modulator are generally limited in bandwidth (being limited, for example, to the 40–860 MHz television band), outside this band it is not possible to obtain a performance (linearity of amplitude and phase) sufficient to compensate the further third-order distortions introduced by the pilot tones used to control the bias voltage.

European patent application EP768765 filed by the applicant enables these difficulties to be overcome by a new method, which makes it possible to use amplifiers with bands limited to the band of the modulating signals (for example, those having a band of 40–860 MHz in cases in which the modulating signals are the set of carriers of television signals), without requiring amplifiers with wider bands, extended towards the low frequencies so that they cover the pilot tones, such amplifiers being expensive and difficult to construct. It also makes it possible to increase the depth of modulation of the pilot tone up to 10% without producing high level of third-order distortions, and therefore to obtain a high efficiency of the bias voltage stabilization loop.

In fact the patent application in question relates to a method of analog modulation of an optical signal in response to a signal whose frequency is in a band of predetermined width, comprising the steps of:

supplying an optical signal to an input of an electro-optical modulator;

supplying an external electrical signal whose frequency is in said band to a linearizing circuit and generating a corresponding pre-distorted electrical signal at an output, having pre-distortion predetermined characteristics;

supplying said pre-distorted electrical signal to the input of said electro-optical modulator;

supplying said electrical bias signal to the input of said electro-optical modulator;

generating a modulated optical signal in said electro-optical modulator;

in which said steps of supplying an electrical bias signal comprises:

generating an electrical pilot signal (pilot tone) at a predetermined frequency;

generating an electrical control signal in response to said modulated optical signal;

generating an electrical bias signal in response to the combination of said electrical control signal, said pilot tone and a reference signal at a predetermined voltage;

characterized in that it also comprises:

supplying said pilot tone superimposed on said external electrical signal to the input of said linearizing circuit;

attenuating said pilot tone at the output of said linearizing circuit before supplying said pre-distorted electrical signal to said electro-optical modulator.

It is known that an optical signal propagated along an optical fibre may give rise, if the optical power density is high, to the generation of radiation by stimulated Brillouin scattering (SBS). This radiation may constitute a source of noise capable of obstructing or impeding the correct reception of the signal at the termination of the optical fibre.

It is also known, from U.S. Pat. No. 4,560,246 and EP 565,035 for example, that the threshold optical power of the aforesaid phenomenon of stimulated Brillouin scattering in an optical fibre increases if the frequency band of the propagated optical signal is increased by phase modulation. The Mach-Zehnder modulator provides an electrode for the phase modulation of the signal to be transmitted.

The power and the frequency of the modulating electrical signal are selected, according to known relations, in such a way as to obtain the requisite widening of the band of the optical signal.

In particular, the phase modulation of an optical signal modifies its spectrum, by distributing part of the spectral power density present in the signal band to form a certain number of bands equally spaced with respect to frequency, with a separation equal to the frequency of the phase modulating signal, which are located on the spectrum on both sides of the central band of frequencies of the optical signal entering the modulator.

The number and relative intensity of the side bands are related to the phase modulation index (the maximum phase shift caused in the optical signal by the phase modulation), which in turn depends on the power of the signal modulating the phase electrode. By suitable selection of the phase modulation index, it is possible to determine the spectral shape of the total band resulting from the envelope of the side bands and central band, and, by suitable selection of the phase modulation frequency, and fixing therefore the frequency separation between the side bands, it is also possible to determine the frequency width of this total band.

In CATV systems it is particularly advantageous to have the television signals available in a plurality of optical cables for more efficient distribution to the users. It is therefore advantageous to use Mach-Zehnder modulators having two outputs. Moreover, in this way the efficiency of the modulators is increased, since the output power is twice that of those having a single output.

U.S. Pat. No. 5,253,309 describes an optical transmission system which makes use of a modulator of the Mach-Zehnder type with a double output. In particular, in one embodiment, the two complementary outputs of the modulator are applied to two optical transmission fibres, and at the receiving end of the optical signal transmission line these fibres are connected to a balanced receiver, which, in order to combine the two received signals, subtracts one from another by means of a differential amplifier. For a correct combination, the two received channels must be balanced with respect to gain and delay. The patent does not describe any control feedback system for the modulator.

In the absence of modulation, the two outputs of a Mach-Zehnder modulator, biased at the inflection point of the characteristic, theoretically have two signals of equal power which have a phase difference of 180° from each other. In the presence of modulation, the total output power (in other words the sum of the two output powers) is constant, but the power present at one output varies in a complementary way with respect to the other output.

The modulator therefore has two electro-optical characteristics, one for each output, with a phase difference of 180°.

The applicant has observed that, by maintaining the bias voltage for the operating point VQ at the inflection point of one of the characteristics of the modulator (with respect to one output), in such a way as to reduce the second-order distortions, the amplitude of these distortions is not identical for both outputs. In particular, it is within the expected values for the output which has the value of VQ under control and is outside the limits for the other output.

The applicant has also observed that the amplitude of the second-order distortions increases when the phase modulation signal is applied to the modulator.

The applicant has also observed that the phase difference between the two characteristics is not exactly 180°.

The applicant has found that it is necessary to keep both outputs of the modulator under control in order to bias it in a suitable way, in order to reduce the amplitude of distortions to a minimum and to compensate the variations of the operating point.

In a first aspect, the present invention relates to an analog optical transmission system with a double output, comprising an optical source, an electro-optical modulator, a source of an electrical modulating signal and a driving circuit for said electro-optical modulator, said electro-optical modulator having:

two optical outputs, supplying a first and a second modulated optical signal which are complementary to each other;

each of said two optical outputs of said modulator is connected to a circuit for sampling a portion of said first and second modulated optical signal, connected to an optical receiver, and capable of generating a first and a second electrical control signal correspondingly in response to a first frequency of said first and second analog modulated optical signal, in which said driving circuit comprises:

a circuit generating an electrical pilot signal at a second frequency, added to said electrical modulating signal;

a conversion circuit capable of producing a continuously converted signal proportional to the difference in amplitude between said first and said second electrical control signal;

a bias circuit capable of generating a bias signal in response to said converted signal.

Preferably, said conversion circuit comprises a demodulator capable of producing at its output a demodulated signal of said difference of amplitude between said first and said second electrical control signal.

Further said conversion circuit comprises an input for a predetermined bias voltage, and an algebraic adder capable of producing at its output a continuous signal equal to the difference between said demodulated signal and said predetermined bias voltage.

Preferably, said second frequency is equal to half said first frequency.

Advantageously said optical modulator comprises an electrode for the phase modulation of said optical signal.

In a second aspect, the present invention relates to a method of modulating an optical signal in response to a signal with a frequency in a predetermined input band, comprising the following steps:

supplying an optical signal to an input of an electro-optical modulator;

supplying an external electrical signal with a frequency in said band to an input of said electro-optical modulator;

modulating said input optical signal with said external electrical signal;

dividing said modulated optical signal into a first and a second modulated optical signal, which are complementary to each other;

supplying an electrical bias signal to an input of said electro-optical modulator, in which said step of supplying an electrical bias signal comprises:

generating an electrical signal at a predetermined frequency outside said predetermined band, this signal being superimposed on said external electrical signal;

generating an electrical control signal in response to said modulated optical signal;

characterized in that said steps of generating an electrical control signal in response to said modulated optical signal comprises:

separating a fraction of said first modulated optical signal and detecting a first electrical feedback signal at a frequency which is twice said predetermined frequency;

separating a fraction of said second modulated optical signal and detecting a second electrical feedback signal at a frequency which is twice said predetermined frequency;

subtracting said first electrical feedback signal from said second electrical feedback signal.

In particular, the step of supplying an electrical bias signal further comprises generating said electrical bias signal in response to the combination of said electrical control signal, said electrical signal at a predetermined frequency and a reference signal at a predetermined voltage.

Preferably, the step of separating a fraction of said first modulated optical signal and detecting a first electrical feedback signal at a frequency which is twice said predetermined frequency comprises the step of bringing said first electrical feedback signal into phase with said second electrical feedback signal, and also of making the amplitude of said first electrical feedback signal equal to that of said second electrical feedback signal.

In particular, the step of generating an electrical control signal comprises separating a fraction of said modulated optical signal and detecting an electrical feedback signal corresponding to it.

Additionally, the step of generating an electrical control signal comprises extracting the component at said predetermined frequency from said electrical feedback signal.

In a third aspect, the present invention relates to a method of modulating an optical signal in response to a signal whose frequency is in a predetermined input band, comprising the following steps:

supplying an optical signal to an input of an electro-optical modulator;

supplying an external electrical signal whose frequency is in said band to an input of said electro-optical modulator;

modulating said input optical signal with said external electrical signal;

dividing said modulated optical signal into a first and a second modulated optical signal which are complementary to each other;

supplying an electrical bias signal to an input of said electro-optical modulator;

measuring the amplitude of the odd-order distortions of said first and second modulated optical signals, characterized in that said electrical bias signal is generated in such a way as to balance the amplitude of the second-order distortions of said first and second modulated optical signals.

In a fourth aspect, the present invention relates to an optical emitter with external analog modulation, comprising an optical source, an electro-optical modulator and a driving circuit for said electro-optical modulator, said electro-optical modulator having:

an optical input for an optical signal, connected to said optical source;

a first electrical input for a modulating signal;

a second electrical input for a bias voltage; and two optical outputs, supplying a first and a second analog modulated signal which are complementary to each other;

each of said two optical outputs of said modulator being associated with an optical receiver capable of receiving a portion of modulated optical signal in which said optical receivers associated said outputs are capable of generating, respectively, a first and a second electrical control signal in response to a second frequency of said first and second analog modulated optical signals, in which said driving circuit comprises:

an input for an external analog electrical signal;

an input for a predetermined bias voltage;

two inputs for said first and second electrical control signals;

a circuit generating an electrical pilot signal at a first frequency;

an algebraic adder capable of producing at its output the difference between said first electrical control signal and said second electrical control signal;

a demodulator capable of producing at its output a demodulated signal of said difference between said first electrical control signal and said second electrical control signal;

an algebraic adder capable of producing at its output a continuous signal equal to the difference between said demodulated signal and said predetermined bias voltage;

an algebraic adder capable of producing at its output said bias voltage which is equal to the sum of said continuous signal and said electrical pilot signal at a first frequency.

Figure 2:
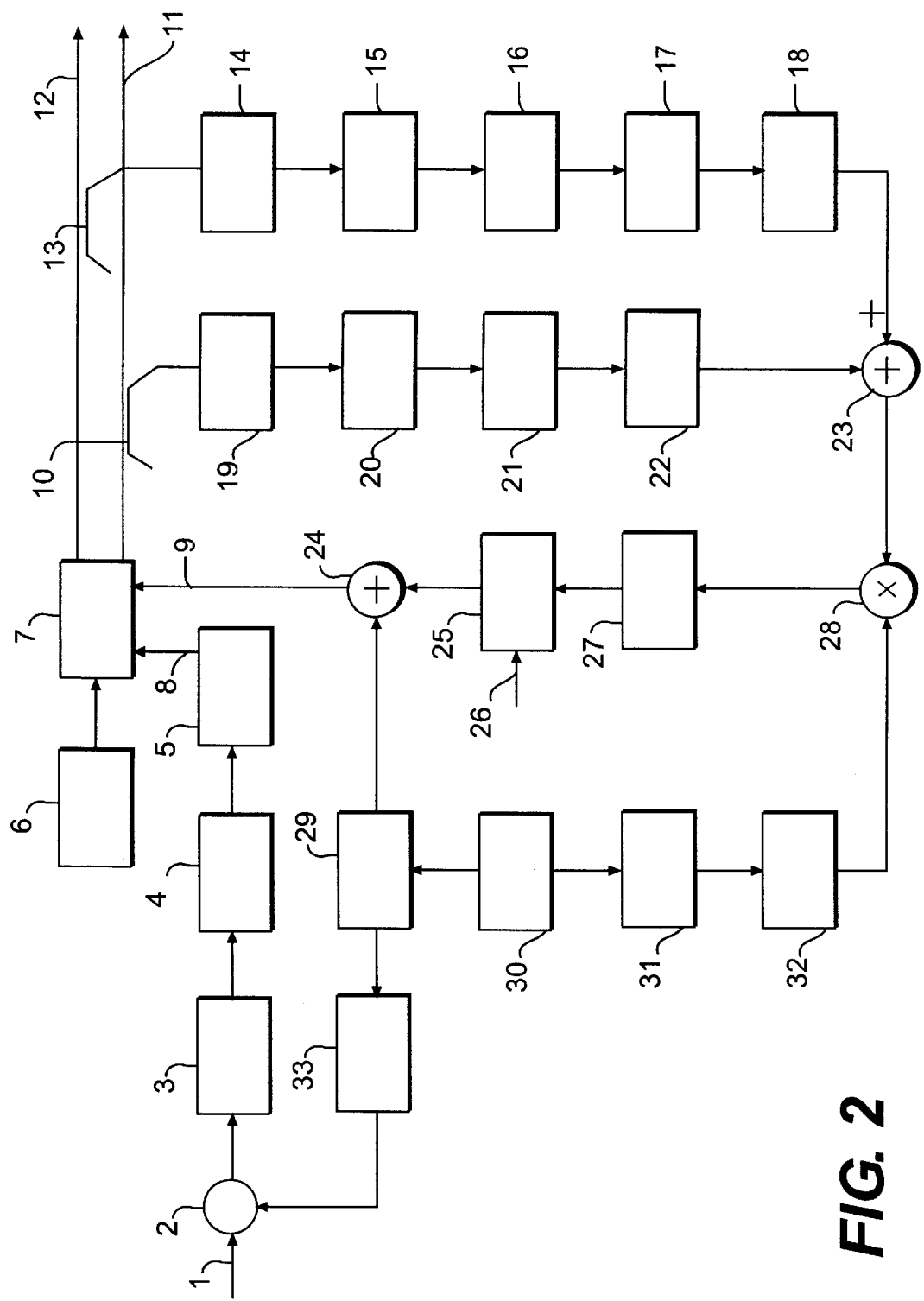
Figure 3:
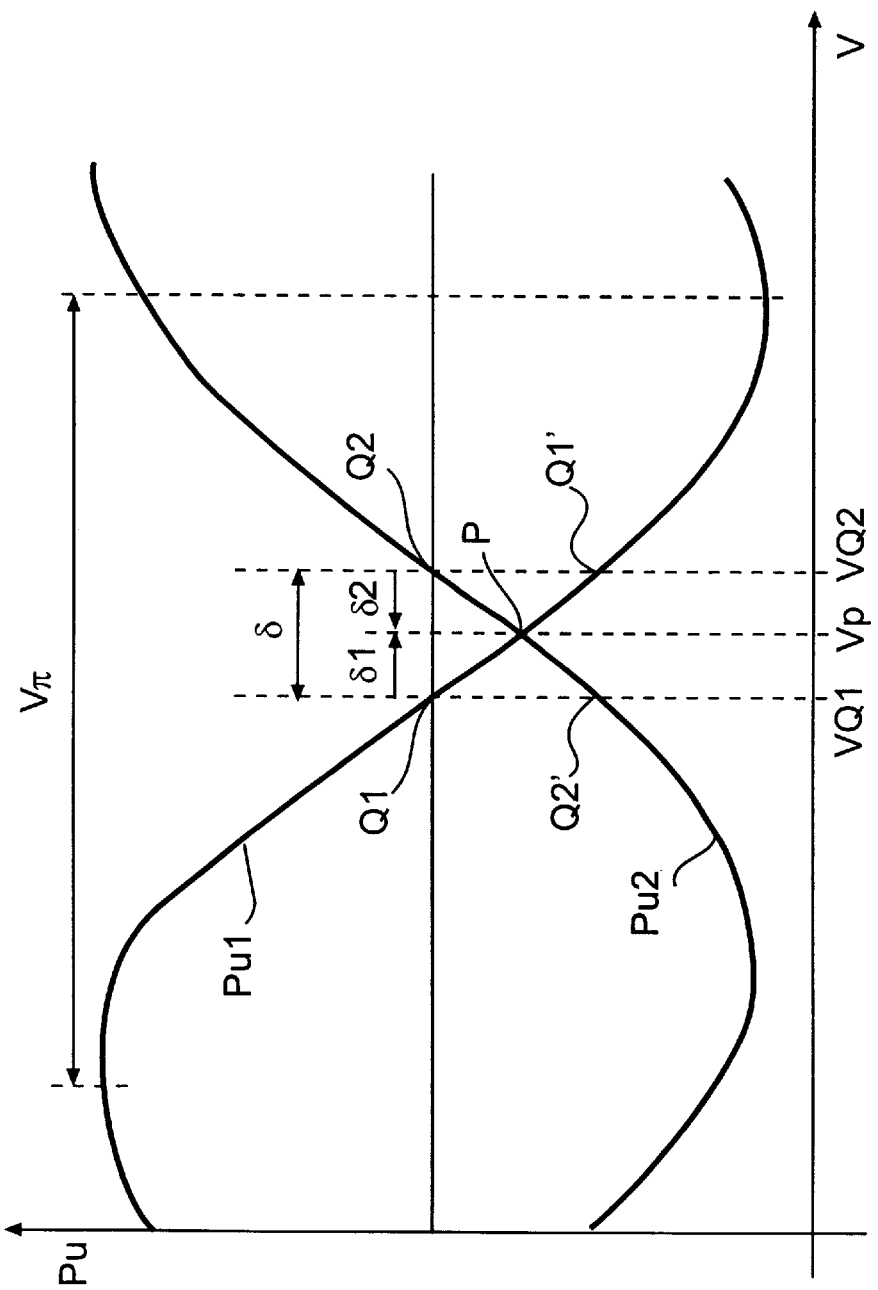

Further details can be obtained from the following description, with reference to the attached figures which show:

FIG. 1, a general diagram of a Mach-Zehnder electro-optical modulator device;

FIG. 2, a diagram of an optical emitter with external modulation according to the present invention;

FIG. 3, a graph representing the optical powers of the 2 outputs of a modulator.

As shown in FIG. 1, a Mach-Zehnder electro-optical interferometric modulator device (model DOPIM 28933, produced by the applicant) comprises:

an optical structure 100 arranged on a crystalline substrate, made from lithium niobate for example, comprising a first section of optical waveguide 101, which is then divided into two adjacent branches 110, 120 which approach each other to form a coupler 102 and are then divided again to form two adjacent branches 111 and 121; the optical structure 100 is conveniently formed by diffusion on the crystalline substrate of a substance capable of changing the refractive index of the substrate, and is capable of passing an optical signal through it;

an electrode structure located between the two branches 110, 120 of the optical structure, and comprising a bias or bias electrode 150 and a signal (or radio-frequency) electrode 160;

a pair of earth electrodes 130, 140, located outside the two branches 110, 120 of the optical structure; the signal electrode 160 is connected to the earth electrodes 130, 140 by a resistive termination 170;

an electrode 180 located on the branch 101 is used to modulate the signal in phase in such a way as to reduce the effects of the stimulated Brillouin scattering.

In a preferred embodiment, the crystalline substrate is made from lithium niobate ($LiNbO_3$), which allows single-mode waveguides with low losses to be formed on its surface, for example by means of a technology of thermal diffusion of thin films of titanium, defined by photolithographic methods.

Preferably, the waveguides described above are of the single-mode type.

The signal, bias and earth electrodes are located with respect to the waveguides of the adjacent branches in such a way as to form corresponding electrical fields capable of modifying the refractive index of the waveguides 110, 120 by an electro-optical effect; the arrangement described is such that an electrical field having the same potential is applied along both branches of the waveguide 110, 120 of the optical structure.

The electro-optical effect which occurs when corresponding electrical signals are applied to the electrodes consists in the variation of the refractive index of the material of the substrate subjected to an electrical field.

In the example shown in the figure, the cut of the crystalline substrate 100 is of the x-cut type.

In the Mach-Zehnder modulator, by the application of an electrical field varies the refractive index of two portions of the path in the waveguide, causing a phase difference between two fractions of an optical signal which is propagated in said portions of the waveguide path in the crystal; this phase difference is then converted into a variation of the amplitude of the signal, by interference or evanescent wave coupling.

An optical emitter with external analog modulation according to the present invention will now be illustrated with reference to the block diagram in FIG. 2.

The number 1 indicates an input for electrical radio-frequency modulation signals, lying within a specified frequency band. The input 1 is connected to one of the inputs of an addition node 2, whose output is connected to a linearizing device 3. This linearizing device 3 is carried out by a pre-distortion circuit having a predetermined input-output characteristic (output voltage as a function of the input voltage).

The input-output characteristic of the linearizing device 3 must be selected according to the input-output characteristic of the electro-optical modulator 7, in such a way as to compensate for its non-linearity, in other words in such a way as to provide a relationship which is as nearly linear as possible between the power of the optical signal at the output of the modulator and the voltage of the modulation signal present at the input 1; in particular, it must be selected in such a way as to minimize the third-order distortions.

The linearizing device 3 is followed by a stop-band filter 4, centered on the frequency of a pilot tone, described below, and an amplifier 5, operating in the frequency band of the RF signals.

The output of the amplifier 5 is connected to an electrode 8 of an electro-optical modulator 7. The electrode 8 is designed for the input of the modulating signals. The electrode for the phase modulation is not shown in FIG. 2. The modulator 7 is of the Mach Zehnder type (model DOPIM 28933, produced by the applicant).

A second electrode 9 of the modulator 7 is designed for the input of a bias signal, by means of which the operating point of the modulator is determined.

Although the presence of two separate electrodes for the modulation and bias signals is preferable for the purposes of the present invention, it is possible to use an electro-optical modulator having a single control electrode, and to combine the modulation and bias signals by means of a suitable circuit.

An electrical signal at radio frequency, called the pilot tone, preferably having a frequency $f1$ below the lower limit of the band of the modulation signals, is generated by a generator 30.

The generator 30 is connected to a band-pass filter 29, centred on the frequency $f1$ and capable of attenuating any component at the frequency $2f1$ (the second harmonic of the pilot tone). The pass-band filter 29 is connected to a variable attenuator-phase converter 33, which in turn is connected to a second input of the addition node 2.

An optical input of the modulator 7 is connected, by optical fibre for example, to a radiation source 6 capable of generating a continuous optical signal. This source may consist of a laser, particularly of the semiconductor type, capable of emitting, for example, in the wavelength band from 1530 to 1565 nm.

A first optical output of the modulator is connected, by an optical fibre for example, to an optical coupler 10, capable of separating the radiation arriving from the modulator 7 in such a way that part of it, preferably from 80% to 99.5%, and more preferably from 90% to 99%, is sent towards an optical output 11, and the remainder is sent towards an optical receiver 19, comprising a photodiode for example.

A second optical output of the modulator is connected, by an optical fibre for example, to an optical coupler 13, capable of separating the radiation arriving from the modulator 7 in such a way that part of it, preferably from 80% to 99.5%, and more preferably from 90% to 99%, is sent towards an optical output 12, and the remainder is sent towards an optical receiver 14, comprising a photodiode for example.

The electrical signals generated by the receivers 19 and 14 in response to the optical signals arriving from the couplers 10 and 13 are sent to the band-pass filters 20 and 15 respectively, which are centred on the frequency $2f1$; the outputs of the band-pass filters 20 and 15 are connected to the amplifiers 21 and 16 and then to the variable attenuators 22 and 17. The output of the variable attenuator 17 is connected to an adjustable phase converter 18. Alternatively, the phase converter 18 may be connected to the variable attenuator 22.

The output of the phase converter 18 is connected to a first input of an algebraic adder 23, and the output of the variable attenuator 22 is connected to a second input of the algebraic adder 23.

The algebraic adder 23 finds the difference between the signal at the frequency $2f1$ arriving from the phase converter 18 and the signal at the frequency $2f1$ arriving from the variable attenuator 22.

The output of the algebraic adder 23 terminates at a first input of an analog multiplier 28.

The analog multiplier 28 performs the function of coherent detection of the difference signal produced in this way; for this purpose, a tone at the second harmonic of the pilot tone ($2f1$), arriving through an adjustable phase converter 32, from a frequency doubler 31 connected to the generator 30, is sent to a second input of the analog multiplier 28. The adjustable phase converter 32 is adjusted in such a way as to optimize the demodulation of the signal at the frequency 2f1 arriving from the algebraic adder 23.

The output of the analog multiplier 28 is connected to the low-pass filter 27, which eliminates the high-frequency components, in such a way that only the continuous component corresponding to the detected signal is present at its output. The two inputs of a differential amplifier 25, used as an algebraic adder which can find the difference between the signals applied to it, are connected, respectively, to a bias reference signal 26 and the detected signal arriving from the low-pass filter 27.

The output of the differential amplifier 25 is connected to an input of the addition node 24, in which the pilot tone arriving from the band-pass filter 29, connected to a second input of the addition node 24, is superimposed on the signal arriving from the differential amplifier 25; the output of the addition node is connected to the bias electrode 9 of the electro-optical modulator 7.

The optical connections, as well as the electrical circuits of the functional units which form the device shown in FIG. 2, may be constructed by known methods.

The device operates in the following way.

The bias voltage control is made by injecting a signal of known frequency f1 (which does not interfere with the television channels) into the modulator 7 and detecting the amplitude and sign, for each of the outputs of the modulator, of an even-order harmonic of this signal, in particular the second harmonic 2f1, whose amplitude is greater than that of the higher-order harmonics.

One of the signals of the second harmonics arriving from the two outputs is subtracted from the other, the resulting signal is detected for example by a synchronous detector, and compared with the second harmonic of the signal injected into the modulator. The difference signal resulting from the comparison is used to bias the modulator 7 at the desired point.

In particular, the signal of the oscillator 30 with suitable amplitude and frequency f1 (generally, f1 is below the minimum frequency of the television channels which is approximately 40 MHz, and is, for example, 10.7 MHz, and the amplitude is such that a depth of modulation of 10% is introduced) is applied to the radio-frequency input port 9 of the modulator. The even-order harmonics of the applied signal will be present (in addition to the odd harmonics) at the output of the modulator. By an optical coupler 10 is collected a fraction of the optical power of an output of the modulator 7 and send it to the photodiode of the receiver 19, which converts it into an electrical signal.

The filter 20 selects the component at the frequency of the second harmonic 2f1 from this electrical signal.

The signal is then amplified by the amplifier 21, and the amplitude of the output signal can be adjusted by means of the attenuator 22. The same function can be provided by a variable-gain amplifier.

The same operations are also carried out for the other output; that is, by an optical coupler 13 is collected a fraction of the optical power of the other output of the modulator 7 and send it to the photodiode of the receiver 14, which converts it into an electrical signal.

The filter 15 selects the component at the frequency of the second harmonic 2f1 from this electrical signal.

The signal is then amplified by the amplifier 16, and the amplitude of the output signal can be adjusted by means of the attenuator 17.

In this branch there is also a phase converter 18, which, in an alternative embodiment, may also be located in the other branch after the attenuator 22.

This phase converter enables the signals to be brought back into phase before they are input into the algebraic adder 23. According to the illustration in FIG. 2, the signal leaving the attenuator 22 is subtracted from the signal leaving the phase converter 18, but in an alternative and equivalent embodiment it is possible to subtract the signal leaving the phase converter 18 from the signal leaving the attenuator 22.

The variable attenuators 17 and 22 and the phase converter 18 are adjusted, at the initial calibration stage, by interrupting the feedback loop before the adder 23 and connecting an instrument such as a two-channel oscilloscope which can compare the signals arriving from the outputs of the phase converter 18 and from the attenuator 22. The operating point of the modulator is set in an area sufficiently distant from the optimal operating point (by supplying a suitable bias reference signal 26) in such a way as to provide a second harmonic 2f1 of the pilot tone of sufficient amplitude for the comparison. The variable attenuators 17 and 22 and the phase converter 18 are adjusted in such a way as to provide two signals of identical amplitude and phase, thus balancing the losses and the delays of the two different paths. At this point, the feedback loop can be closed.

The difference signal leaving the algebraic adder 23 is compared (in respect of amplitude and sign), by means of a synchronous demodulator, with a signal at the frequency f2 obtained from the oscillator 30 and from the frequency doubler 31. The analog multiplier 28 is used as synchronous demodulator.

The synchronous demodulator formed by the analog multiplier 28 could be replaced by another type of demodulator, such as the envelope demodulator, thus eliminating the doubler 31 and the phase converter 32. A simpler circuit is thus obtained, although with the loss of the higher performance of a synchronous demodulator.

The output of the demodulator consists of a continuous component and of a second-order beat of the signals entering the analog multiplier 28, this beat being eliminated by the low-pass filter 27.

The value and sign of the continuous component depends on the deviation of the bias voltage from the value of the intermediate operating point at the operating points VQ of the two characteristics of the modulator.

The differential amplifier 25 carries out the comparison with the bias reference signal 26. The (continuous) signal at the output of the differential amplifier 25 sets the operating point at the point of balancing the amplitude of the second-order distortions of the two modulated optical signals. The differential amplifier 25 may be replaced by an algebraic adder able to make the difference between the two input signals. This signal at the output of the differential amplifier is added (by the adder 24) to the signal at the frequency f1 arriving from the oscillator 30 and applied to the second (bias) electrode 9 of the modulator 7.

The blocks identified by the numbers 23, 27, 28 and 32 form a conversion circuit which can produce a continuously converted signal proportional to the difference in amplitude between a first electrical signal and a second electrical signal present at the output of the blocks 18 and 22.

It should be noted that the total reduction of the second-order (CSO) intermodulation products of the two outputs increases as much as decrease the deviation of the bias voltage from the optimal central value.

In the device according to the present invention, the problems of stability and response of the bias voltage control loop (the feedback loop) can be resolved by a suitable selection of the compensation pole, after the overall response of the loop has been determined. The device also provides for sending the pilot tone to the linearizing device 3, together with the modulating signals. In this way, the pre-distortion circuit generates the signals compensating for the distortion produced in the modulator by the superimposition of the modulating signals on the pilot tone applied to the modulator together with the bias control voltage. The pilot tone sent to the linearizing device 3 must be capable of being varied suitably in amplitude and phase, by means of a variable attenuator and phase converter 33, in order to obtain the maximum suppression of the third-order beats between the pilot tone and the modulating signals.

According to the present invention, only the pre-distortion circuit 3 (and in particular its input circuits) have to have a response adapted to the frequency of the pilot tone, while this response is not required in the amplifier, since this operates in the video band from 40 to 860 MHz.

To prevent the pilot tone from reaching the optical modulator through the amplifier, a stop-band filter 4 is preferably present between the pre-distortion circuit and the amplifier, to attenuate the pilot tone by a suitable amount (at least 10–15 dB).

Alternatively, it is possible to attenuate the pilot tone effectively by adding the pilot tone to the opposite phase after the linearizing device. In greater detail, in place of the stop-band filter 4 it is possible to connect between the pre-distortion circuit 3 and the amplifier 5 an addition node, not shown in the figure, by means of which a signal formed from the pilot tone by varying its phase and amplitude in such a way as to minimize the output component at the frequency of the pilot tone is added to the signal arriving from the pre-distortion circuit 3.

Further alternatives to this procedure may be used. For example, it is possible to apply the signal at the frequency f1 leaving the oscillator 30 directly to the terminal of the adder 24 (through the filter 29 if necessary). This alternative does not make use of the addition node 2, the band-elimination filter 4 and the variable attenuator and phase converter 33.

We shall now examine in greater detail the positioning of the operating point of the modulator, with reference to FIG. 3, where the bias voltage V is shown on the horizontal axis and the output power Pu is shown on the vertical axis.

FIG. 3 shows the curve of the output power Pu1 for an output 11 of the modulator 7, and the curve of the output power Pu2 for the other output 12 of the modulator 7, as a function of the voltage applied to the modulator. These curves have a phase difference of 180° between them (phase opposition) with an additional phase difference 67 (observed by the applicant) which in some cases may be as much as several degrees (for example 2°), in particular when the phase modulation is in operation. The optimal operating point for the curve Pu1, that is located at its inflection point, is indicated by Q1, and is defined by the voltage VQ1. In this case, the operating point for the curve Pu2 would be the point indicated by Q2', again defined by the voltage VQ1. The point Q2' thus has a phase difference of 67 degrees from its optimal operating point (Q2).

A similar situation is present if we select the optimal operating point for the curve Pu2, indicated by Q2, and defined by the voltage VQ2. In this case, the operating point of the curve Pu1 is that indicated by Q1', again defined by the voltage VQ2. The point Q1' has a phase difference of δ degrees from its optimal operating point (Q1).

By selecting the operating point Q1 or Q2, we obtain a reduction of the second-order distortions at the corresponding outputs, but there will be a high value (equal to a phase difference of δ) of the distortions at the corresponding complementary outputs.

In fact, it may be demonstrated that the second-order distortions (for a single carrier) are related to the phase difference δ by the following relation:

$$D2/C = 20 * \log\left|\frac{J2(\beta)}{J1(\beta)} * \tan(\delta)\right|$$

where

D2 is the second harmonic,

C is the carrier,

J1 and J2 are the first- and second-order Bessel functions.

If it is assumed that the optical signal is modulated with a plurality of carriers of smaller amplitude whose sum (in terms of power, since we are considering the carriers which are not correlated with each other) is equal to that of the individual carrier (condition of equal modulation index δ), the equation shown above will again be true, but, since in this case the beats are composite ones among a plurality of carriers, the term D2/C will correspond to the CSO.

The applicant has found that, when the operating point is set at approximately P, defined by the bias voltage Vp, at a distance of δ1=−δ2=δ/2 degrees from the two optimal operating points Q1 and Q2, there is an equal level of distortion at both outputs. In particular, since the operating points are at a distance of 67/2 degrees from the two optimal operating points Q1 and Q2, the level of distortion of the worst channel is halved, although this increases the level of distortion of the channel whose operating point was at the optimal point, but however the latter distortion remains within acceptable limits.

It is considered that with a phase difference δ of ±0.2° good performance can be ensured for both outputs of the modulator, with a CSO of the order of 65 dB below the level of the video carrier of each channel.

The relative powers at the two outputs can be represented by the following mathematical expressions.

$Pu1(t)=P_0/2+P_0/2 \sin \delta 1 J_0(\beta)+-P_0\Sigma_{k-1\to oo}(-1)^k \cos \delta 1 J_{2k-1}(\beta)\cos (2k-1)\omega_m t++P_0\Sigma_{k-1\to oo}(-1)^k \sin \delta 1 J_{2k}(\beta)\cos 2k\ \omega_m t$ $Pu2(t)=P_0/2 \sin \delta 2 J_0(\beta)++P_0\Sigma_{k-1\to oo}(-1)^k \cos \delta 2 J_{2k-1}(\beta)\cos (2k-1)\omega_m t+-P_0\Sigma_{k-1\to oo}(-1)^k \sin \delta 2 J_{2k}(\delta)\cos 2k)\omega_m t$ where Pu1 is the power at the output 1, Pu2 is the power at the output 2, $P_0$ is the peak power, δ1 is the phase difference between the operating point Q1 and the operating point P, δ2 is the phase difference between the operating point Q2 and the operating point P, Jn is the Bessel function of order n, $\beta=\pi Vm/V\pi$ is the modulation index of the modulating signals, expressed in radians, $\omega_m$ is the modulation frequency.

From the mathematical expressions shown above it may be seen that, if δ1=−δ2 (operating point P in FIG. 3), both the even-order distortions and the odd-order distortions of each output will be of equal amplitude (in absolute terms).

In particular, the even-order distortions are in phase with each other, and the odd-order distortions are in phase opposition.

The applicant has observed that the selection indicated above for the operating point also makes it possible to optimize the third-order distortions, since when the outputs are balanced the amplitude of the third-order distortions is also balanced. The linearizing device 3 is therefore capable of producing this amplitude of distortion in phase opposition so that the distortion produced by the modulator can be cancelled. If the modulator is biased at the optimal operating point of a characteristic, the linearizing device 3 is at best capable of cancelling the distortions of the corresponding output, but not those of the complementary output. This effect, which is imperceptible for values of δ close to 0.2°, becomes measurable if δ increases.

According to the present invention, it is possible to improve further the performance of the control system.

This is because the operation of subtracting the second-harmonic signals of the pilot tone present at the two outputs (an operation carried out by the algebraic adder 23) makes it possible to have an increase of approximately 3 dB in the signal-to-noise ratio of the control system. Since the signals are coherent, their voltages are added (+6 dB), but since the noise contributions present in the two signals are not coherent, their powers are added (+3 dB).

The applicant has noted that the double-output Mach-Zehnder modulator has a phase difference called δ between the outputs, due principally to the imperfections in the construction of the modulator; when the phase modulation signal is applied, the phase difference δ varies, and in particular it increases. This variation is principally due to the fact that this signal, having a rather high power (of the order of several watts), causes a rise in the temperature of the modulator.

As the temperature varies, the operating points Q1 and Q2 change in absolute value and in relative value with respect to each other, the distance δ between them becoming variable as a function of the temperature. The system as described above is capable of compensating for the variations of the operating point, the point of intersection between the two curves Pu1 and Pu2 still being selected as the operating point.

A circuit was provided for measuring the performance.

A generator of 64 frequencies with a spectral purity of more than 80 dB, with frequencies ranging from 95 to 540 MHz and an inequalization of less than ±0.25 dB (Matrix type SX-16) was connected to the modulator under test.

The outputs of the modulator were applied, in sequence, to a low-noise optical receiver with a wide band (40–900 MHz) and low intermodulation, then to a band-pass filter and subsequently to an electrical spectrum analyser (Rhode & Schwarz type FSA).

The measurements made (in dB), shown below in Table 1, were obtained in the following conditions:

signal at the input of the linearizing device:—16 dBm per channel, implying an optical modulation index (OMI) of approximately 4% per channel;

optical power at the input of the optical receiver: 0 dBm;

power applied to the phase modulation electrode: 34.74 dBm (3 W) at the frequency of 1,975 MHz;

the intermodulation (CSO and CTB) and noise contribution to the optical receiver "Rx" were negligible with respect to the measurements.

In Table 1,

"LOOP n" indicates the branch of the feedback loop which was closed (operating point Q1 or Q2);

"OUT n" identifies the optical output of the branch in which the measurement was made (1 or 2);

"NEWLOOP" indicates that the adjustment circuit described by the invention was used;

"CNR" indicates the signal-to-noise ratio (carrier to noise ratio);

"Average" indicates the mean value of the measurements made at different frequencies applied to the modulator.

It will be clearly seen that the CSO of the branch opposite that used for adjusting the operating point is less than the limit of 65 dB.

With the adjustment circuit described here, the CSOs of the two branches are comparable to each other, and the value is greater than 65 dB.

TABLE 1

| | | | MHz | | | |
|---|---|---|---|---|---|---|
| | | | 96.25 | 350.25 | 541.25 | AVERAGE |
| LOOP 1 | OUT 1 | CSO | 73.9 | 75.2 | 78.6 | 75.9 |
| | | CTB | 70.4 | 67.5 | 71.3 | 69.8 |
| | | CNR | 55.2 | 54.1 | 54.8 | 54.7 |
| | OUT 2 | CSO | 57.3 | 60.3 | 62.3 | 60.0 |
| | | CTB | 70.4 | 67.6 | 71.0 | 69.7 |
| | | CNR | 55.2 | 54.1 | 54.8 | 54.7 |
| LOOP 2 | OUT 1 | CSO | 59.1 | 62.1 | 62.2 | 61.2 |
| | | CTB | 70.2 | 67.1 | 70.9 | 69.4 |
| | | CNR | 55.1 | 54.0 | 54.7 | 54.6 |
| | OUT 2 | CSO | 76.2 | 73.6 | 77.0 | 75.6 |
| | | CTB | 70.9 | 67.9 | 72.1 | 70.3 |
| | | CNR | 55.3 | 54.3 | 55.1 | 54.9 |
| NEWLOOP | OUT 1 | CSO | 66.5 | 68.3 | 73.4 | 69.4 |
| | | CTB | 70.5 | 67.0 | 70.4 | 69.3 |
| | | CNR | 55.1 | 54.1 | 54.7 | 54.6 |
| | OUT 2 | CSO | 66.3 | 67.2 | 69.1 | 67.5 |
| | | CTB | 71.0 | 67.3 | 71.7 | 70.0 |
| | | CNR | 55.3 | 54.3 | 55.0 | 54.9 |

What is claimed is:

1. Analog optical transmission system with a double output, comprising an optical source, an electro-optical modulator, a source of an electrical modulating signal and a driving circuit for said electro-optical modulator, said electro-optical modulator having:

two optical outputs, supplying a first and a second modulated optical signal, which are complementary to each other;

each of said two optical outputs of said modulator is connected to a circuit for sampling a portion of said first and second modulated optical signal, connected to an optical receiver, and capable of generating a first and a second electrical control signal correspondingly in response to a first frequency of said first and second analog modulated optical signal, in which said driving circuit comprises:

a circuit generating an electrical pilot signal at a second frequency, added to said electrical modulating signal;

a conversion circuit capable of producing a continuously converted signal proportional to the difference in amplitude between said first and said second electrical control signal;

a bias circuit capable of generating a bias signal in response to said converted signal.

2. System according to claim 1, characterized in that said conversion circuit comprises a demodulator capable of producing at its output a demodulated signal of said difference of amplitude between said first and said second electrical control signal.

3. System according to claim 2, characterized in that said conversion circuit comprises an input for a predetermined bias voltage, and an algebraic adder capable of producing at its output a continuous signal equal to the difference between said demodulated signal and said predetermined bias voltage.

4. System according to claim 1, characterized in that said second frequency is equal to half said first frequency.

5. System according to claim 1, characterized in that said optical modulator comprises an electrode for the phase modulation of said optical signal.

6. Method of modulating an optical signal in response to a signal with a frequency in a predetermined input band, comprising the following steps:

supplying an optical signal to an input of an electro-optical modulator;

supplying an external electrical signal with a frequency in said band to an input of said electro-optical modulator;

modulating said input optical signal with said external electrical signal;

dividing said modulated optical signal into a first and a second modulated optical signal, which are complementary to each other;

supplying an electrical bias signal to an input of said electro-optical modulator, in which said stage of supplying an electrical bias signal comprises:

generating an electrical signal at a predetermined frequency outside said predetermined band, this signal being superimposed on said external electrical signal;

generating an electrical control signal in response to said modulated optical signal;

characterized in that said step of generating an electrical control signal in response to said modulated optical signal comprises:

separating a fraction of said first modulated optical signal and detecting a first electrical feedback signal at a frequency which is twice said predetermined frequency;

separating a fraction of said second modulated optical signal and detecting a second electrical feedback signal at a frequency which is twice said predetermined frequency;

subtracting said first electrical feedback signal from said second electrical feedback signal.

7. Method according to claim 6, characterized in that the step of supplying an electrical bias signal further comprises generating said electrical bias signal in response to the combination of said electrical control signal, said electrical signal at a predetermined frequency and a reference signal at a predetermined voltage.

8. Method according to claim 6, characterized in that the step of separating a fraction of said first modulated optical signal and detecting a first electrical feedback signal at a frequency which is twice said predetermined frequency comprises the step of bringing said first electrical feedback signal into phase with said second electrical feedback signal.

9. Method according to claim 6, characterized in that the step of separating a fraction of said first modulated optical signal and detecting a first electrical feedback signal at a frequency which is twice said predetermined frequency comprises the step of making the amplitude of said first electrical feedback signal equal to that of said second electrical feedback signal.

10. Method according to claim 6, characterized in that said step of generating an electrical control signal comprises separating a fraction of said modulated optical signal and detecting an electrical feedback signal corresponding to it.

11. Method according to claim 6, characterized in that said step of generating an electrical control signal comprises extracting the component at said predetermined frequency from said electrical feedback signal.

12. Method of modulating an optical signal in response to a signal whose frequency is in a predetermined input band, comprising the following steps:

supplying an optical signal to an input of an electro-optical modulator;

supplying an external electrical signal whose frequency is in said band to an input of said electro-optical modulator;

modulating said input optical signal with said external electrical signal;

dividing said modulated optical signal into a first and a second modulated optical signal which are complementary to each other;

supplying an electrical bias signal to the input of said electro-optical modulator;

measuring the amplitude of the odd-order distortions of said first and second modulated optical signals, characterized in that said electrical bias signal is generated in such a way as to balance the amplitude of the second-order distortions of said first and second modulated optical signals.

13. Optical emitter with external analog modulation, comprising an optical source, an electro-optical modulator and a driving circuit for said electro-optical modulator, said electro-optical modulator having:

an optical input for an optical signal, connected to said optical source;

a first electrical input for a modulating signal;

a second electrical input for a bias voltage; and two optical outputs, supplying a first and a second analog modulated signal which are complementary to each other;

each of said two optical outputs of said modulator being associated with an optical receiver capable of receiving a portion of modulated optical signal in which said optical receivers associated with said outputs are capable of generating, respectively, a first and a second electrical control signal in response to a second frequency of said first and second analog modulated optical signals, in which said driving circuit comprises:

an input for an external analog electrical signal;

an input for a predetermined bias voltage;

two inputs for said first and second electrical control signals;

a circuit generating an electrical pilot signal at a first frequency;

an algebraic adder capable of producing at its output the difference between said first electrical control signal and said second electrical control signal;

a demodulator capable of producing at its output a demodulated signal of said difference between said first electrical control signal and said second electrical control signal;

an algebraic adder capable of producing at its output a continuous signal equal to the difference between said demodulated signal and said predetermined bias voltage;

an algebraic adder capable of producing at its output said bias voltage which is equal to the sum of said continuous signal and said electrical pilot signal at a first frequency.

* * * * *